United States Patent
Bruderick

(10) Patent No.: US 9,376,089 B1
(45) Date of Patent: Jun. 28, 2016

(54) HINGED SEATBELT CONNECTION

(71) Applicant: GM GLOBAL TECHNOLOGY OPERATIONS LLC, Detroit, MI (US)

(72) Inventor: Richard L. Bruderick, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/666,802

(22) Filed: Mar. 24, 2015

(51) Int. Cl.
*B60R 22/18* (2006.01)
*B60R 22/26* (2006.01)

(52) U.S. Cl.
CPC .............. *B60R 22/26* (2013.01); *B60R 22/18* (2013.01)

(58) Field of Classification Search
CPC ........ B60R 22/16; B60R 22/26; B60R 22/30; B60R 2022/1806; B60R 2022/207; B60R 2022/263; B60R 2022/266
See application file for complete search history.

(56) References Cited

U.S. PATENT DOCUMENTS

| | | | | |
|---|---|---|---|---|
| 6,517,157 | B1* | 2/2003 | Vorac | B60N 2/0232 297/344.13 |
| 2007/0164596 | A1* | 7/2007 | Di Grande | B60R 22/02 297/481 |
| 2011/0057432 | A1* | 3/2011 | You | B60N 2/688 280/804 |
| 2011/0215558 | A1* | 9/2011 | Singer | B60R 21/18 280/733 |
| 2016/0031411 | A1* | 2/2016 | Shimazu | B60R 22/20 297/482 |

* cited by examiner

*Primary Examiner* — Drew Brown
(74) *Attorney, Agent, or Firm* — Quinn Law Group, PLLC

(57) ABSTRACT

A seat belt system for a vehicle having a vehicle structure and a seat operatively connected to the vehicle structure includes a lap belt having a first end and a second end. The first end of the lap belt includes a buckle element and the second end of the lap belt includes a belt link. The seat belt system also includes a cable having a first end and a second end. The first end of the cable is connected to an anchor and the second end of the cable includes a ferrule. The seat belt system additionally includes a hinge operatively connecting the belt link to the ferrule. The hinge operates to pivot the belt link relative to the ferrule when an occupant of the vehicle is positioned in the seat and restrained by the seatbelt system.

20 Claims, 3 Drawing Sheets

HINGED SEATBELT CONNECTION

TECHNICAL FIELD

The present disclosure relates to a hinged connection for a seatbelt in a vehicle.

BACKGROUND

Vehicles are typically provided with seats designed to accommodate the operator and passenger(s) of the vehicle. Frequently, such seats are configured to shift inside the vehicle as well as recline in order to enhance passenger comfort and be moved out of the way to generate useful space for transporting cargo. Some vehicle seats employ mechanisms that permit the seats to fold and/or be removed from the subject vehicle to further improve the versatility of the subject vehicle.

Most vehicle seats work together with seatbelts configured to restrain the vehicle's operator and passengers. Typically, seatbelts are configured as flexible bands or straps and employ buckles to fasten two ends of the seatbelt around the vehicle occupant. In some vehicles seatbelts are attached directly to vehicle body structure, while in other vehicles seatbelts are incorporated into structures of the seats.

SUMMARY

A seat belt system for a vehicle having a vehicle structure and a seat operatively connected to the vehicle structure includes a lap belt having a first end and a second end. The first end of the lap belt includes a buckle element and the second end of the lap belt includes a belt link. The seat belt system also includes a cable having a first end and a second end. The first end of the cable is connected to an anchor and the second end of the cable includes a ferrule. The seat belt system additionally includes a hinge operatively connecting the belt link to the ferrule. The hinge operates to pivot the belt link relative to the ferrule when an occupant of the vehicle is positioned in the seat and restrained by the seatbelt system. The seat may be pressed against the hinge by the restrained occupant positioned in the seat or the occupant's mass may cause the cushion to compress while the lap belt arranged around the occupant imparts an angle to the hinge.

The hinge may include a knuckle defining a first aperture and a second aperture and may also include a leaf having a leaf pin. In such a case, the leaf pin may project into each of the first aperture and the second aperture of the knuckle.

Each of the leaf and the belt link may be formed from steel.

The ferrule and the knuckle may be formed together as a unitary, i.e., single-piece and structurally uniform, component.

The leaf pin may be formed from a first pin and a second pin. In such a case, the first leaf pin and the second leaf pin can project into the respective first aperture and second aperture of the knuckle.

The leaf may include a first claw, while the belt link may include a second claw configured to interlock, i.e., link, with the first claw.

Each of the first and second claws may include a pair of projections. In such a case, the pair of projections of the first claw is configured to catch or hook onto the pair of projections of the second claw.

The leaf may define a first aperture, while the belt link may define a second aperture. In such a case, a fastener may extend through each of the first and second apertures, thereby fastening the leaf to the belt link.

The ferrule may be crimped onto the cable.

The anchor may be fixed directly to one of the vehicle structure and the seat.

A vehicle having the disclosed seatbelt system is also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
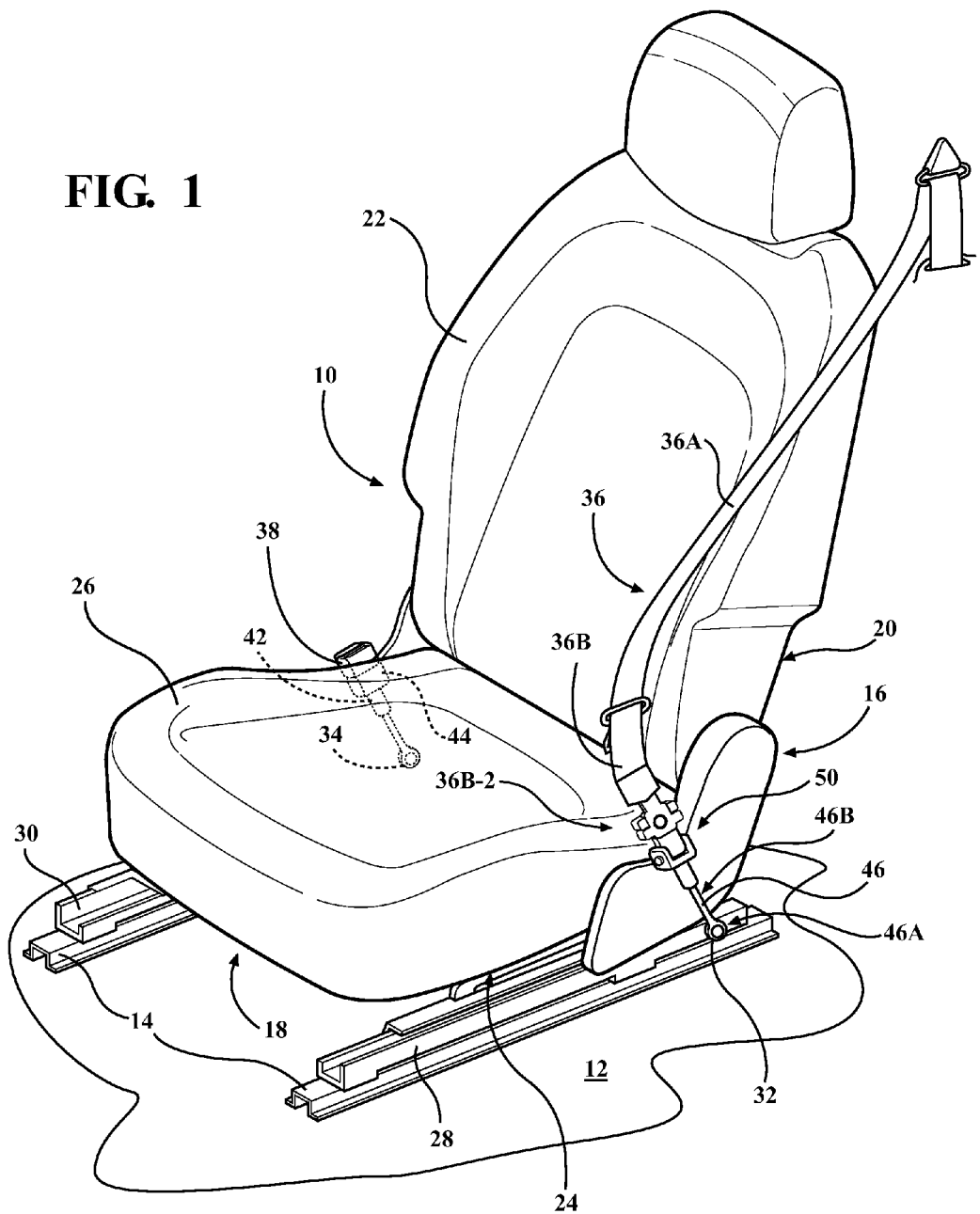
FIG. 1 is a perspective view of a seatbelt system including a seat mounted in a vehicle and having a seatbelt system employing a hinged joint or connection between a lap belt and a cable according to the disclosure, illustrating the seat being unoccupied and the seatbelt system being unbuckled.
Figure 2:
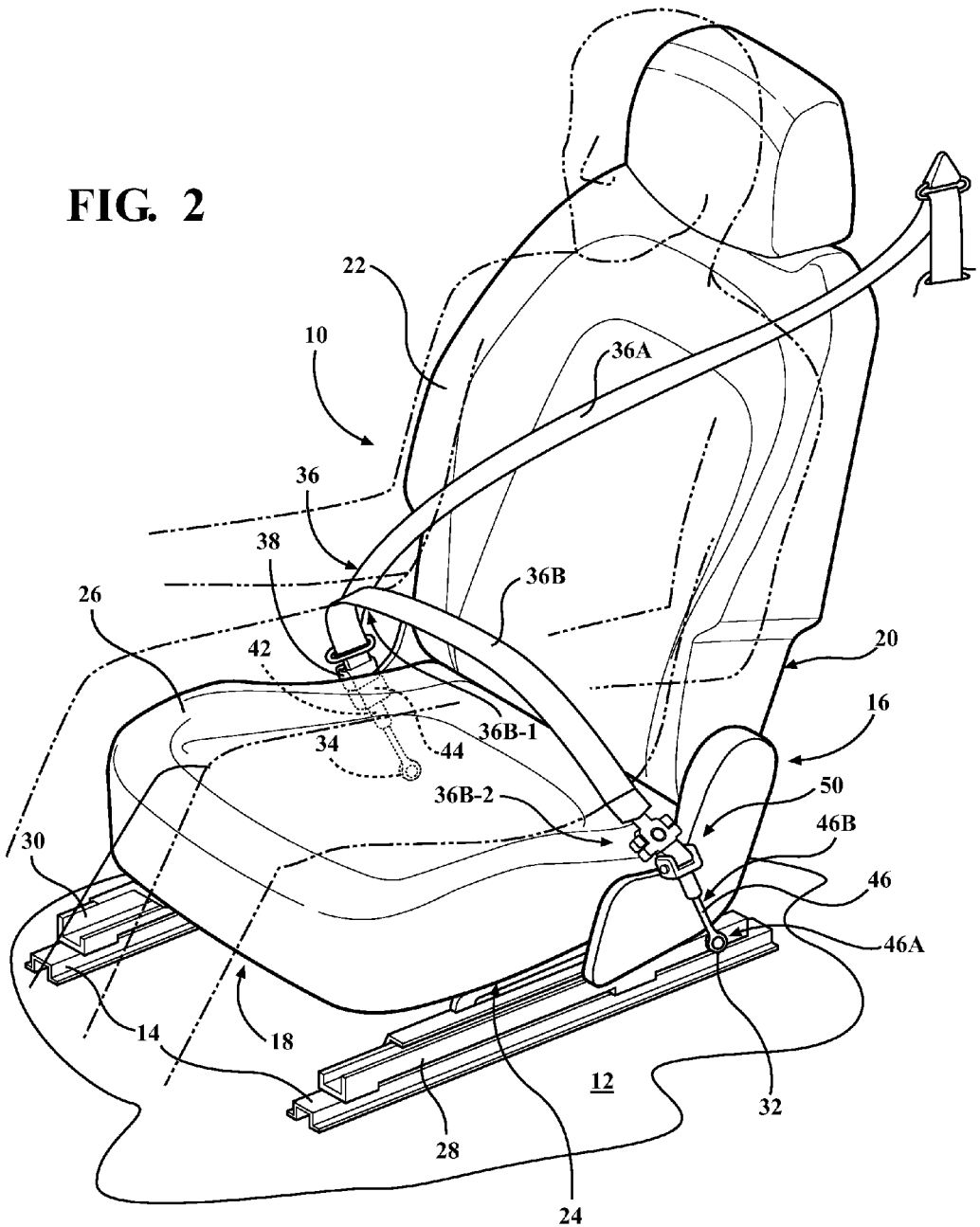
FIG. 2 is a perspective view of the seatbelt system shown in FIG. 1, illustrating an occupant of the vehicle positioned in the seat and restrained by the seatbelt system, wherein the seat imparts a pivoting action to the hinged connection according to the disclosure.

Referring to the drawings, wherein like reference numbers refer to like components, FIGS. 1 and 2 shows a perspective view of a seatbelt system 10 positioned inside a vehicle 12 and operatively connected to a vehicle structure 14. The vehicle 12 may have any body style configuration, for example a sedan, a wagon, or a van, and includes a passenger compartment 15. The vehicle 12 includes a seat 16 positioned inside the passenger compartment 15 and operatively connected to the vehicle structure 14. As will be described in detail below, the seatbelt system 10 is intended to interact with the seat 16 for the purpose of securing an occupant of the vehicle 12.

The seat 16 includes a seat frame 18. The seat frame 18 includes a first seat structure 20 that is configured to support a seatback 22. The seat frame 18 also includes a second seat structure 24 that is configured to support a cushion 26. The first seat structure 20 is pivotably attached to the second seat structure 24 to accommodate an occupant of the vehicle 12. The second seat structure 24 includes a first track 28 and a second track 30. As shown, the seat 16 is slidably mounted to the vehicle structure 14 via the first track 28 and the second track 30.

The seatbelt system 10 is configured to provide a passive restraint for an occupant of the seat 16. The seatbelt system 10 includes a first anchor 32 and a second anchor 34. The first anchor 32 may be fixed either to the vehicle structure 24 proximate to the seat 16 or directly to the seat. The second anchor 34 may be similarly connected to the vehicle structure 24 proximate to the seat 16 or to the seat itself. The seatbelt system 10 also includes a first belt 36. The first belt 36 includes a sash or shoulder belt 36A and a lap belt 36B, wherein the shoulder belt is configured to be arranged around the torso of the occupant of the seat 16, and the lap belt is configured to be arranged around the occupant's hips or waist. As shown in each of FIGS. 1 and 2, the lap belt 36B has a first end 36B-1 that is slidably engaged with a first buckle element 38. As shown in FIG. 2, the lap belt 36B also has a second end 36B-2 that includes a belt link 40. The belt link 40 may be formed from a material, such as steel, capable of withstanding significant tensile loads as may be seen by vehicle seatbelt systems. The belt link 40 operatively connects the lap belt 36B to the first anchor 32 for secure attachment of the first belt 36 to the vehicle structure 24 via a mounting cable 46 that will be described in detail below. Accordingly, the lap belt 36B connects the first buckle element 38 to the first anchor 32.

The shoulder belt 36A is typically connected to a retractor-pretensioner (not shown) mounted to the vehicle structure 14 and is configured to selectively retract and tension the lap belt 36B. As understood by those skilled in the art, the retractor function of such a retractor-pretensioner permits some free movement of the seated occupant's upper torso, while the pretensioner function preemptively tightens the lap belt 36B and secures the occupant with respect to the seat 16 in the event of sudden acceleration or deceleration of the vehicle 12. Accordingly, as described above, the first belt 36 may be a retractable combination lap-shoulder belt.

As shown, the seatbelt system 10 also includes a second belt 42. The second belt 42 is connected to the second anchor 34 and includes a second buckle element 44. The second buckle element 44 is complementary to the first buckle element 38 such that the first buckle element may be engaged with and fastened to the second buckle element, specifically to restrain the seated occupant. For example, the first buckle element 38 may be a male buckle element, in which case the second buckle element 44 would be a female buckle member designed to engage the first buckle member, or vice versa. Accordingly, when the first buckle element 38 is fastened to the second buckle element 44 the seated occupant is securely restrained within the vehicle 12. The second belt 42 may be encased in a sheath (not shown) and include an actual flexible belt end or a more rigid, spring-like connection to the second buckle element 44.

As shown in FIGS. 1-2, the seatbelt system 10 also includes the above-noted mounting cable 46. The cable 46 has a first end 46A and a second end 46B. The first end 46A of the cable 46 is connected to the first anchor 32, while the second end 46B includes a ferrule 48. The ferrule 48 may be crimped onto or otherwise attached to the mounting cable 46 for a reliable connection between the subject components. The seatbelt system 10 additionally employs an articulating joint between the lap belt 36B and the mounting cable 46, wherein the joint includes a hinge 50. The hinge 50 operatively connects the belt link 40 to the ferrule 48. The hinge 50 is configured to pivot or pitch the belt link 40 relative to the ferrule 48 through an angle θ relative to an axis X (as shown in FIG. 4) when the occupant of the vehicle is positioned in the seat 16 and restrained by the seatbelt system 10.

The hinge 50 may pivot the belt link 40 relative to the ferrule 48 through the angle θ by the cushion 26 being pressed against the hinge 50. The cushion 26 may be pressed against the hinge 50 when the occupant of the vehicle 10 is positioned in the seat 16 and restrained by the seatbelt system 10, which causes the weight of the occupant to deflect the seat cushion. In other words, the hinge 50 may be arranged such that when the occupant is restrained in the seat 16, the seat cushion 26 deflected under the occupant's weight imparts a pivoting action to the hinge 50 via actual contact with the hinge. Alternatively, the mass of the seated and restrained occupant may cause the cushion 26 to compress, but not put physical pressure on the hinge 50, while the lap belt 36B arranged around the occupant shifts toward the second seat structure 24 and imparts the angle θ to the hinge.

Figure 3:
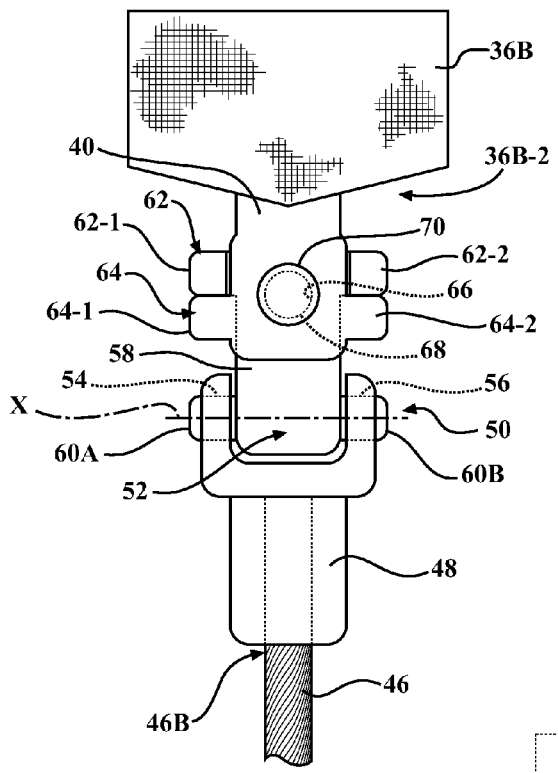
FIG. 3 is a close-up plan view of the hinged connection shown in FIGS. 1 and 2.
Figure 4:
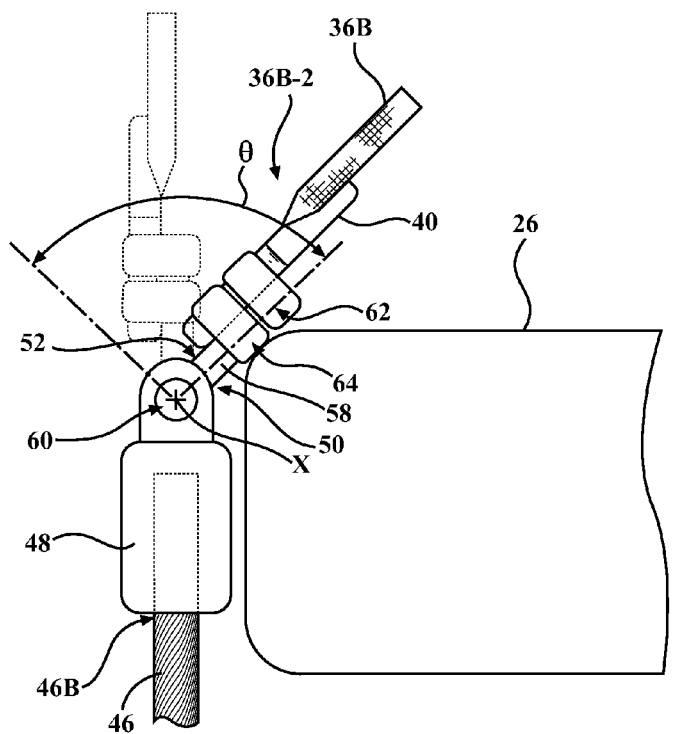
FIG. 4 is a close-up side view of the hinged connection shown in FIGS. 1-3.

As shown in the close-up views of FIGS. 3-4, the hinge 50 may include a knuckle 52. As shown, the knuckle 52 defines a first aperture 54 and a second aperture 56. The knuckle 52 may also include a hinge leaf 58. Similar to the belt link 40, and for a similar reason, the hinge leaf 58 may be formed from steel. The hinge leaf 56 includes a leaf pin 60. The leaf pin 60 projects into each of the first aperture 54 and the second aperture 56 of the knuckle 50. The leaf pin 60 may be formed from a first leaf pin 60A and a second leaf pin 60B. As shown, the first leaf pin 60A projects into the first aperture 54 while the second leaf pin 60B projects into the second aperture 56 of the knuckle 52. The ferrule 48 and the knuckle 52 may be formed together as a single-piece, unitary component, rather than being assembled or joined from separate pieces.

With continued reference to FIGS. 3-4, the hinge leaf 58 includes a first claw 62. The belt link 40 includes a second claw 64 configured to connect and interlock with the first claw 62. As shown, each of the first and second claws 62, 64 includes a pair of projections, the first claw 62 has projections 62-1 and 62-2, while the second claw 64 has projections 64-1 and 64-2. The projections 62-1, 62-2 are configured to catch or hook onto and ensnare the projections 64-1, 64-2, respectively. As shown, the hinge leaf 58 defines a first aperture 66, while the belt link 40 defines a second aperture 68. A fastener 70 may be inserted into the first and second apertures 66, 68 such that the fastener extends through both first and second claws 62, 64, thereby fastening the hinge leaf 58 to the belt link 40, such that the tension force transmitted through the lap belt 36B can also be transferred through the fastener 70. The fastener 70 may be a rivet, as shown in FIG. 3, or a screw and a nut (not shown), configured to maintain a fixed connection between the belt link 40 and the hinge leaf 58. A tension force transmitted through the lap belt 36B can be transferred through the hooked and fastened connection between the first claw 62 and the second claw 64.

The hinge 50 may be encased in a protective sheath (not shown) such that various foreign objects do not become entangled with the described hinge components and their inner workings. Such a sheath would be capable of bending or otherwise adapting to accommodate the hinge 50 being pivoted by the seat cushion 26 under the occupant's weight. Overall, according to the above disclosure, the seatbelt system 10 provides a hinged joint or connection intended to facilitate pivoting articulation between the mounting cable 46 and the lap belt 36B when the occupant of the vehicle 12 is restrained in the seat 16.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:
1. A seat belt system for a vehicle having a seat, the seatbelt system comprising:

a lap belt having a first end and a second end, wherein the first end of the lap belt includes a buckle element and the second end of the lap belt includes a belt link;

a cable having a first end and a second end, wherein the first end of the cable is connected to an anchor and the second end of the cable includes a ferrule; and a hinge operatively connecting the belt link to the ferrule, wherein the hinge pivots the belt link relative to the ferrule when an occupant of the vehicle is positioned in the seat and restrained by the seatbelt system.

2. The seatbelt system of claim 1, wherein:

the hinge includes a knuckle defining a first aperture and a second aperture, and a leaf having a leaf pin; and the leaf pin projects into each of the first aperture and the second aperture of the knuckle.

3. The seatbelt system of claim 2, wherein each of the leaf and the belt link is formed from steel.

4. The seatbelt system of claim 2, wherein the ferrule and the knuckle are formed together as a unitary component.

5. The seatbelt system of claim 2, wherein:

the leaf pin is formed from a first leaf pin and a second leaf pin; and the first leaf pin and the second leaf pin project into the respective first aperture and second aperture of the knuckle.

6. The seatbelt system of claim 2, wherein:

the leaf includes a first claw; and the belt link includes a second claw configured to interlock with the first claw.

7. The seatbelt system of claim 2, wherein:

each of the first and second claws includes a pair of projections; and the pair of projections of the first claw is configured to catch the pair of projections of the second claw.

8. The seatbelt system of claim 2, wherein:

the leaf defines a first aperture;

the belt link defines a second aperture; and a fastener extends through each of the first and second apertures, thereby fastening the leaf to the belt link.

9. The seatbelt system of claim 1, wherein the ferrule is crimped onto the cable.

10. The seatbelt system of claim 1, wherein:

the vehicle includes a vehicle structure;

the seat is operatively connected to the vehicle structure; and the anchor is fixed directly to one of the vehicle structure and the seat.

11. A vehicle comprising:

a vehicle structure;

a seat operatively connected to the vehicle structure; and a seatbelt system having:

a lap belt having a first end and a second end, wherein the first end of the lap belt includes a buckle element and the second end of the lap belt includes a belt link;

a cable having a first end and a second end, wherein the first end of the cable is connected to an anchor and the second end of the cable includes a ferrule; and a hinge operatively connecting the belt link to the ferrule, wherein the hinge pivots the belt link relative to the ferrule when an occupant of the vehicle is positioned in the seat and restrained by the seatbelt system.

12. The vehicle of claim 11, wherein:

the hinge includes a knuckle defining a first aperture and a second aperture, and a leaf having a leaf pin; and the leaf pin projects into each of the first aperture and the second aperture of the knuckle.

13. The vehicle of claim 12, wherein each of the leaf and the belt link is formed from steel.

14. The vehicle of claim 12, wherein the ferrule and the knuckle are formed together as a unitary component.

15. The vehicle of claim 12, wherein:

the leaf pin is formed from a first leaf pin and a second leaf pin; and the first leaf pin and the second leaf pin project into the respective first aperture and second aperture of the knuckle.

16. The vehicle of claim 12, wherein:

the leaf includes a first claw; and the belt link includes a second claw configured to interlock with the first claw.

17. The vehicle of claim 12, wherein:

each of the first and second claws includes a pair of projections; and the pair of projections of the first claw is configured to catch the pair of projections of the second claw.

18. The vehicle of claim 12, wherein:

the leaf defines a first aperture;

the belt link defines a second aperture; and a fastener extends through each of the first and second apertures, thereby fastening the leaf to the belt link.

19. The vehicle of claim 11, wherein the ferrule is crimped onto the cable.

20. The vehicle of claim 11, wherein the anchor is fixed directly to one of the vehicle structure and the seat.

* * * * *